United States Patent [19]

Braun

[11] Patent Number: 5,664,654

[45] Date of Patent: *Sep. 9, 1997

[54] SYNCHRONIZER WITH SELF-ENERGIZING

[75] Inventor: Eugene R. Braun, Royal Oak, Mich.

[73] Assignee: Eaton Corporation, Cleveland, Ohio

[*] Notice: The term of this patent shall not extend beyond the expiration date of Pat. No. 5,544,727.

[21] Appl. No.: 629,670

[22] Filed: Apr. 9, 1996

Related U.S. Application Data

[63] Continuation of Ser. No. 293,761, Aug. 15, 1994, Pat. No. 5,544,727, which is a continuation-in-part of Ser. No. 172,796, Dec. 27, 1993, abandoned.

[51] Int. Cl.⁶ .................................................. F16D 23/06
[52] U.S. Cl. .................... 192/48.91; 192/53.31; 192/53.34
[58] Field of Search ..................... 192/53.31, 53.34, 192/48.91

[56] References Cited

U.S. PATENT DOCUMENTS

| | | |
|---|---|---|
| 3,548,983 | 12/1970 | Hiraiwa . |
| 5,003,834 | 4/1991 | Muller et al. ............... 192/53.34 X |
| 5,092,439 | 3/1992 | Reynolds . |
| 5,425,437 | 6/1995 | Nellums ..................... 192/53.36 X |

FOREIGN PATENT DOCUMENTS

| | | |
|---|---|---|
| 1098824 | 1/1959 | Germany . |
| 4527483 | 3/1967 | Japan . |

*Primary Examiner*—Rodney H. Bonck
*Attorney, Agent, or Firm*—Paul S. Rulon

[57] ABSTRACT

A baulkring-type synchronizer (18) includes cone clutch friction surfaces (24,48 and 26,50) and jaw clutch teeth (36b,28 and 36c,30) for frictionally synchronizing and positive connecting gears (14, 16) to a shaft (12). A plurality of rigid members (72) are drivingly interposed between blocker teeth (44,46) affixed to baulkrings (40,42) and self-energizing ramp surfaces (70a–70d) defined on an outer circumference of a hub 32 affixed to the shaft (12) A shift sleeve (34) is slidably splined to the hub (32) and is moved by an operator shift force ($F_o$) and an additive force ($F_a$) provided by the self-energizing ramp surfaces. Both forces ($F_o$ and $F_a$) react against the blocker teeth to engage the friction surfaces. The self-energizing ramp surfaces may be long enough to assist shift completion as unblocking occurs.

11 Claims, 4 Drawing Sheets

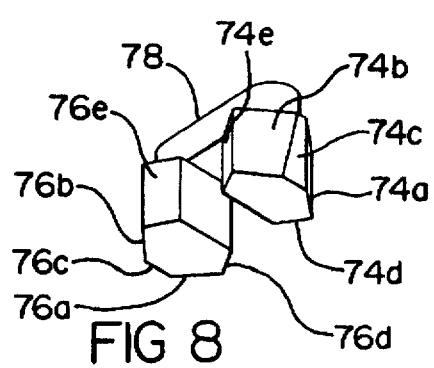
FIG 8
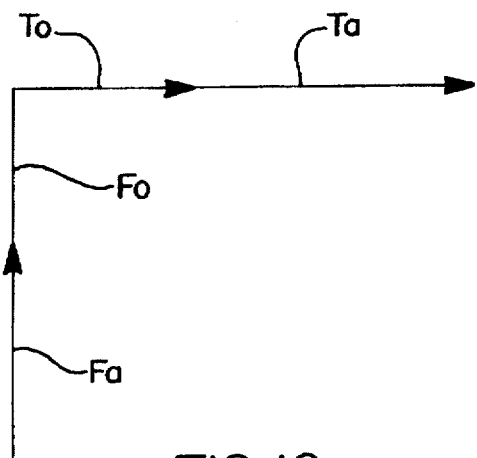
FIG 10
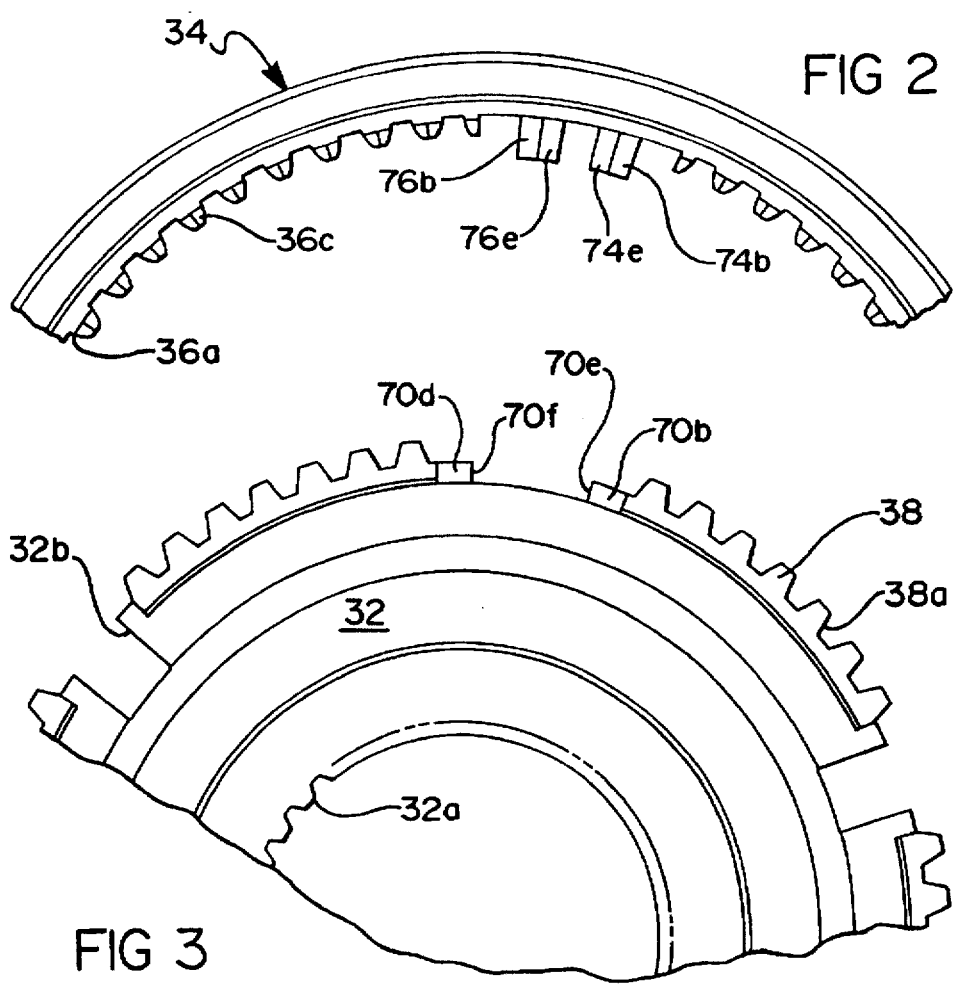
FIG 2
FIG 3

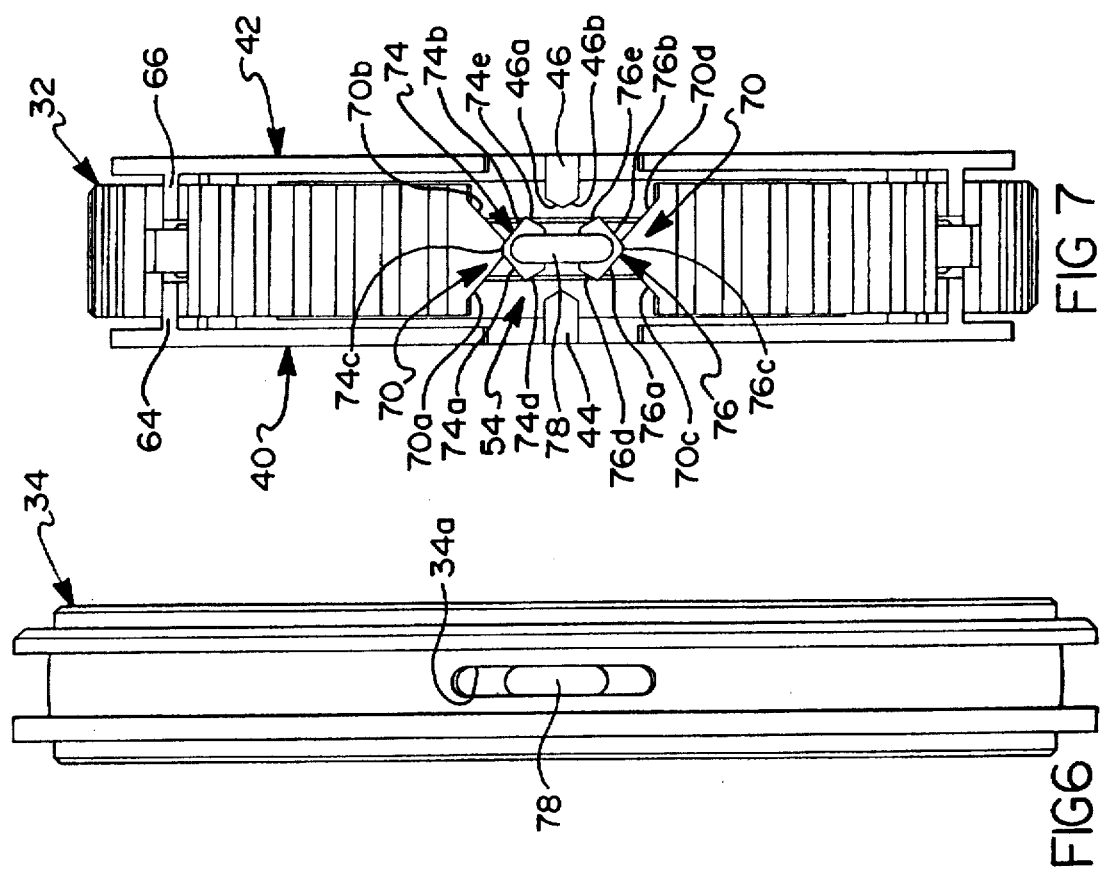

SYNCHRONIZER WITH SELF-ENERGIZING

This is a continuation of application(s) Ser. No. 08/293,761 filed on Aug. 15, 1994 and now U.S. Pat. No. 5,544,727, which is a CIP of application Ser. No. 08/172,796 filed on Dec. 27, 1993 now abandoned.

FIELD OF THE INVENTION

This invention relates to a baulkring-type synchronizer having self-energizing.

BACKGROUND OF THE INVENTION

Baulkring-type synchronizer mechanisms for use in multi-ratio transmissions are well known. Such mechanisms include pairs of friction and jaw members for respectively synchronizing and positive clutching a gear to a shaft, pre-energizer assemblies for engaging the friction members in response to initial engaging movement of a shift sleeve, a hub rotatably fixed to the shaft and having external spline teeth slidably receiving internal spline teeth of the shift sleeve which often defines one of the jaw member pairs, a baulkring having blocker teeth for arresting engaging movement of the shift sleeve until synchronization is reached and for transferring a shift force from the sleeve to increase the engaging force of the friction members.

It is also known in the multiple ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size and weight, synchronizer mechanisms of the self-energizing type are especially important for trucks, particularly for heavy duty trucks. A baulkring-type synchronizer of the self-energizing type may be seen by reference to U.S. Pat. No. 3,548,983, which is incorporated herein by reference. A pin-type synchronizer of the self-energizing type may also be seen by reference to U.S. Pat. No. 5,092,439, which is also incorporated herein by reference.

SUMMARY OF THE INVENTION

An object of this invention is to provide a baulkring-type synchronizer with improved self-energizing.

According to a feature of the invention, a clutch frictionally synchronizes and positive connects first and second drives disposed for relative rotation about a common axis. The clutch comprises first jaw means axially movable from a neutral position to an engaged position with second jaw means for positive connecting the drives in response to engaging movement of the first jaw means by an axially directed shift force $F_o$. The first jaw means includes a central opening having internal splines with axially extending flank surfaces slidably mating continuously with axially extending flank surfaces of external splines for preventing relative rotation between the internal and external splines. The external splines are affixed against rotation and axial movement relative to the first drive. A first friction surface is axially movable into engagement with a second friction surface in response to the engaging movement of the first jaw means for producing a synchronizing torque. First and second blocker means have angled surfaces movable into engagement in response to the engaging movement of the first jaw means for preventing asynchronous engagement of the jaw means, for transmitting the shift force $(F_o)$ to the first friction surface to effect an engagement force of the friction surfaces, and for producing a torque counter to the synchronizing torque for moving the first and second blocker means out of engagement as synchronization is reached. First and second self-energizing means are operative when engaged to react the synchronizing torque for producing an additive axial force $(F_a)$ in the direction of the shift force $(F_o)$ for increasing the engagement force of the friction surfaces. The first and second self-energizing means include means for directing the additive axial force $(F_a)$ to the first friction surface via the blocker means.

According to a feature of the invention, a clutch frictionally synchronizes and positive connects first and second drives disposed for relative rotation about a common axis. The clutch comprises first jaw means axially movable from a neutral position to an engaged position with second jaw means for positive connecting the drives in response to engaging movement of the first jaw means by an axially directed shift force $F_o$. The first jaw means includes a central opening having internal splines with axially extending flank surfaces slidably mating continuously with axially extending flank surfaces of external splines for preventing relative rotation between the internal and external splines. The external splines are affixed against rotation and axial movement relative to the first drive. A first friction surface is axially movable into engagement with a second friction surface in response to the engaging movement of the first jaw means for producing a synchronizing torque. First and second blocker means have angled surfaces movable into engagement in response to the engaging movement of the first jaw means for preventing asynchronous engagement of the jaw means, for transmitting the shift force $(F_o)$ to the first friction surface to effect an engagement force of the friction surfaces, and for producing a torque counter to the synchronizing torque for moving the first and second blocker means out of engagement as synchronization is reached. First and second self-energizing means are operative when engaged to react the synchronizing torque for producing an additive axial force $(F_a)$ in the direction of the shift force $(F_o)$ for increasing the engagement force of the friction surfaces. The first and second self-energizing means include means for directing the additive axial force $(F_a)$ to the first friction surface via the blocker means.

The clutch is characterized by a first element defining a hub including an outer circumference defining the external splines. A first baulkring includes the first friction surface and a plurality of the second blocker surfaces. The baulkring is axially movable away from the hub toward the second friction surface. The first jaw means central opening and internal splines are affixed to a second element defined by a shift sleeve. The first self-energizing means includes a plurality of first self-energizing ramp surfaces affixed to a one of the elements. A plurality of members are mounted about another of the elements for limited rotation relative to each of the elements and secured against radial movement relative to each of the elements. Each member includes a second angled self-energizing ramp surface operative in response to the synchronizing torque to engage a one of the first self-energizing ramp surfaces, whereby the additive axial force $(F_a)$ is produced and directed to the first friction surface (50) via the blocker surfaces.

According to a feature of the invention, a clutch frictionally synchronizes and positive connects first and second drives disposed for relative rotation about a common axis. The clutch comprises first jaw means axially movable from a neutral position to an engaged position with second jaw means for positive connecting the drives in response to engaging movement of the first jaw means by an axially directed shift force $F_o$. The first jaw means includes a central opening having internal splines with axially extending flank surfaces slidably mating continuously with axially extending flank surfaces of external splines for preventing relative rotation between the internal and external splines. The external splines are affixed against rotation and axial movement relative to the first drive. A first friction surface is axially movable into engagement with a second friction surface in response to the engaging movement of the first jaw means for producing a synchronizing torque. First and second blocker means have angled surfaces movable into engagement in response to the engaging movement of the first jaw means for preventing asynchronous engagement of the jaw means, for transmitting the shift force ($F_o$) to the first friction surface to effect an engagement force of the friction surfaces, and for producing a torque counter to the synchronizing torque for moving the first and second blocker means out of engagement as synchronization is reached. First and second self-energizing means are operative when engaged to react the synchronizing torque for producing an additive axial force ($F_a$) in the direction of the shift force ($F_o$) for increasing the engagement force of the friction surfaces. The first and second self-energizing means include means for directing the additive axial force ($F_a$) to the first friction surface via the blocker means.

The clutch is characterized by the first self-energizing means including a plurality of first self-energizing ramp surfaces affixed against movement relative to the first drive. The first jaw means includes a plurality of circumferentially spaced apart openings extending radially therethrough. A rigid member is mounted in each spaced apart opening for limited rotation relative thereto and for non-axial movement relative thereto. Each rigid member includes a second angled self-energizing ramp surface of the second self-energizing means.

BRIEF DESCRIPTION OF THE DRAWINGS

The synchronizer of the invention is shown in the accompanying drawings in which:

FIGS. 2 and 3 are relief views of broken away portions of components in FIG. 1 looking axially relative to the shaft;

FIG. 4 is a relief view of components of the synchronizer in FIG. 1 with the components rotated 90 degrees relative to FIG. 1 and 60 degrees relative to FIGS. 5–7, and with a shift sleeve in FIGS. 1 and 6 removed;

FIG. 5 is a relief view of a baulkring in FIGS. 1, 4 and 7;

FIG. 6 is a relief view of a shift sleeve of the synchronizer in FIG. 1;

FIG. 7 is the assembled components of FIG. 4 rotated 60 degrees relative to FIG. 4 plus the rigid member of FIG. 8;

FIG. 8 is a perspective view of a rigid member in FIGS. 1 and 7;

FIG. 10 is a graphical representation of axial forces and torques acting across blocker surfaces of the synchronizer mechanism.

DETAILED DESCRIPTION OF THE DRAWINGS

Figure 1:
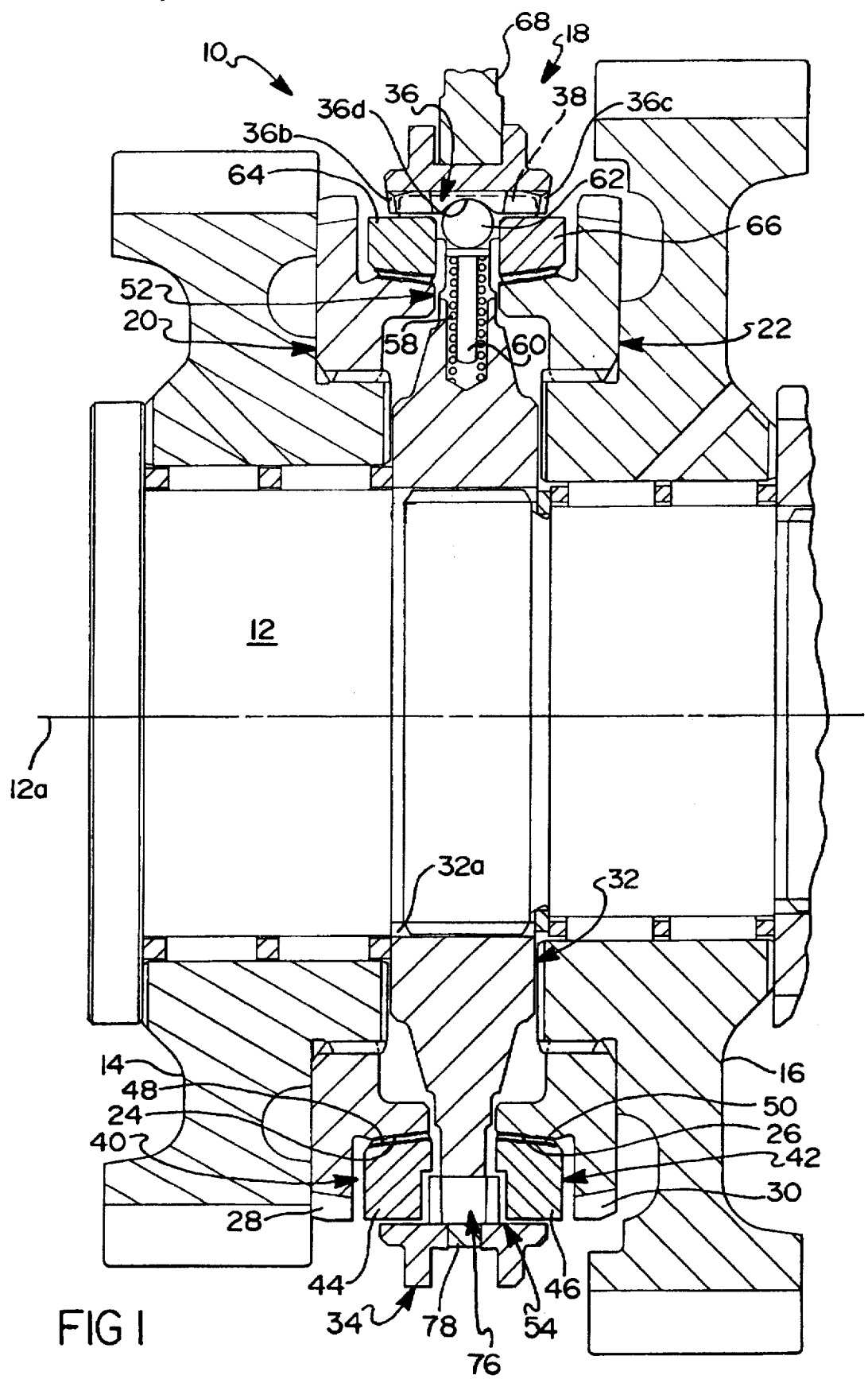
FIG. 1 is a sectional view of a double-acting baulkring-type synchronizer in a neutral position and disposed for rotation about the axis of a shaft.

The term "synchronizer clutch mechanism" shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate a synchronizer clutch mechanism which includes ramps or cams or the like to increase the engaging force of the synchronizing clutch in proportion to the synchronizing torque of the friction clutch.

Looking now at FIGS. 1–8, therein is shown a gear and synchronizer assembly 10 which forms part of a multi-ratio change speed transmission. Assembly 10 includes a shaft 12 mounted for rotation about a central axis 12a, axially spaced apart gears 14,16 supported on the shaft for rotation relative thereto and secured against axial movement relative to the shaft in known manner, and a double-acting synchronizer clutch mechanism 18.

The synchronizer clutch mechanism 18 includes annular members 20,22 axially and rotatably affixed to gears 14,16 in known manner, gear friction surfaces 24,26 herein integral with members 20,22, gear jaw teeth 28,30 herein integral with members 20,22, a hub member 32 axially and rotatably affixed at a central opening 32a thereof to shaft 12, a shift sleeve 34, internal spline teeth 36 defined on a central opening of sleeve 34 and in constant mesh with external spline teeth 38 defined on the outer circumference of hub 32, baulkrings 40,42, blocker teeth sets 44,46 and friction surfaces 48,50 herein integral with baulkrings 40,42, pre-energizer assemblies 52, and a self-energizing/blocker assembly 54. Herein, the synchronizer includes three circumferentially spaced apart self-energizing/blocker assemblies 54 which cooperate with a like number of blocker teeth on each baulkring, and three circumferentially spaced apart pre-energizer assemblies. Each blocker tooth 44,46 respectively includes angled blocker surfaces 44a,44b,46a,46b.

As is readily seen, friction surfaces 24,48 and 26,50 pair up to define friction clutches for synchronizing the gears to the shaft prior to engagement of the jaw clutch members. Cone clutches are preferred; however, other types of friction clutches may be used. A wide range of cone angles may be used. Cone angles of seven and one-half degrees are employed herein. The friction surfaces may be defined by any of several known friction materials affixed to the base member, e.g., pyrolytic carbon friction materials such as disclosed in U.S. Pat. Nos. 4,700,823; 4,844,218 and 4,778, 548 may be used. These patents are incorporated herein by reference.

Spline teeth 36,38 have axially extending flank surfaces 36a,38a which continuously mate in close sliding relation so that there is relatively no free play between shift sleeve 34 and shaft 12. Opposite ends of splines 36 define jaw teeth 36b,36c which respectively mate with gear teeth positive clutch the gears to the shaft. With reference to FIGS. 9, the flank side of jaw teeth 36b,36c and of gear jaw teeth 28,30 are provided with an antibackout or locking angle feature to prevent inadvertent disengagement of the teeth. Details of this feature may be seen by reference to U.S. Pat. No. 4,727,968 which is incorporated herein by reference. As may be seen in FIG. 9H, when jaw teeth 36c and 30 are fully engaged there remains a substantial engaged length of flank surfaces 36a,38a to distribute forces from transmitted torque and thereby minimize wear.

Each pre-energizer assembly 52, which is known in the art, includes a helical compression spring 58 and plunger 60 disposed in a radially extending blind bore in hub 32 and biasing a roller or ball 62 (herein a roller) into an annular detent groove 36d in shift sleeve splines 36. Pre-energizer assembly 52 resiliently positions shift sleeve 34 in the neutral position shown in FIGS. 1 and 9A. Rollers 62 are axially spaced between abutment surfaces 64a,66a of a plurality of tabs 64,66 (herein three) formed integral with baulkrings 40,42. The tabs extend into recesses 36b in hub 32 for limiting rotation of the baulkring relative to the hub and shaft.

When it is desired to couple either gear to the shaft, an appropriate and unshown shift mechanism, such as disclosed in U.S. Pat. No. 4,920,815 and incorporated herein by reference, moves shift sleeve 34 axially via a partially shown shift fork 68 along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, pre-energizer assemblies apply a pre-energizer force proportional to the force applied by the operator to the shift sleeve. Whether manually or automatically applied, the force is applied to the shift sleeve in an axial direction and is proportional to the force $F_o$ in FIG. 10. The pre-energizer force, depending on direction of shift sleeve movement by the shift force ($F_o$), moves either friction surface 48 or 50 into initial engagement with its associated friction surface to clock the associated baulkring to a position relative to hub 32 for positioning the self-energizing/blocker assemblies 54 in a manner explained hereinafter.

Self-energizing/blocker assemblies 54 each comprise self-energizing means 70 including self-energizing or boost ramp surfaces 70a,70b,70c,70d extending oblique to the rotational plane of hub 32 and defined in the outer circumference of the hub and non-boost surfaces 70e,70f extending perpendicular to the rotational plane, the blocker teeth 44,46, and a rigid member 72 for reacting blocker and self-energizing forces. Member 72 includes circumferentially spaced apart end portions 74,76 rigidly secured together by a circumferentially extending portion 78 received in a circumferentially extending slot 34a in shift sleeve 34. Slot 34a allows limited circumferential movement of member 72 therein relative to the sleeve and prevents axial movement therein relative to the sleeve. End portion 74 includes self-energizing ramp surfaces 74a,74b which respectively react against surfaces 70b,70a when shift sleeve 34 is moved axially left or right, a non-boost surface 74c which reacts against surface 70e when the synchronizer clutch mechanism 18 is in the neutral position of FIGS. 1 and 7, and blocker surfaces 74d,74e which respectively react against surfaces 44a,46a of blocker teeth 44,46. In a like manner, end portion 76 includes self-energizing ramp surfaces 76a, 76b for respectively reacting against surfaces 70d,70c, a non-boost surface 76c for reacting against surface 70f, and blocker surfaces 76d,76e for respectively reacting surfaces 44b, 46b. The engaged position of non-boost surfaces 70e, 70f,74c,76c prevents unwanted activation of the self-energizing ramps in the event there is some amount of torque produced by one of the cone clutches, e.g., viscous shear of oil between the cone clutch friction surface may produce a torque that could otherwise activate the ramps;

Looking now at the self-energizing/blocker assembly 80 in FIGS. 9A–9H, this schematically illustrated embodiment differs from the previous embodiment in that blocker teeth 44,46 include axial extensions 44c,46c received between rigid member ends 74,76 which are circumferentially spaced further apart, as are the self-energizing ramp surfaces defined by hub 32. Extensions 44c,46c are to ensure positioning of teeth 44,46 between ends 74,76.

Figure 9A:
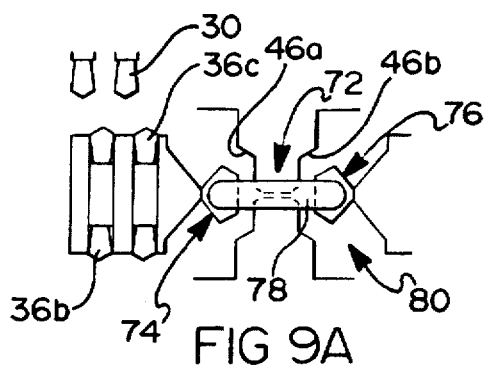
FIGS. 9A–9H schematically illustrate an alternative embodiment of blocking and self-energizing components in FIGS. 1–8 and several stages of operation of the components which also apply to the embodiment of FIGS. 1–8.
Figure 9B:
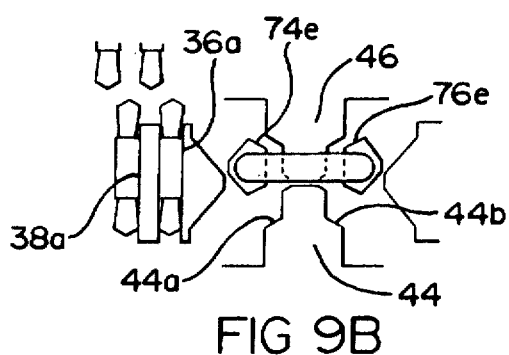
Figure 9C:
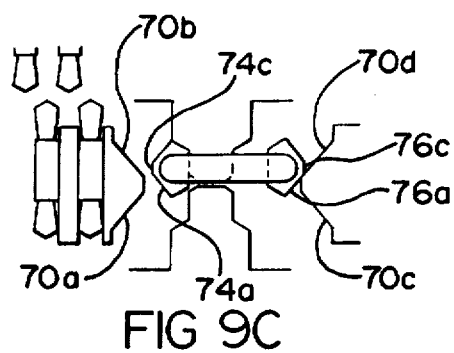
Figure 9D:
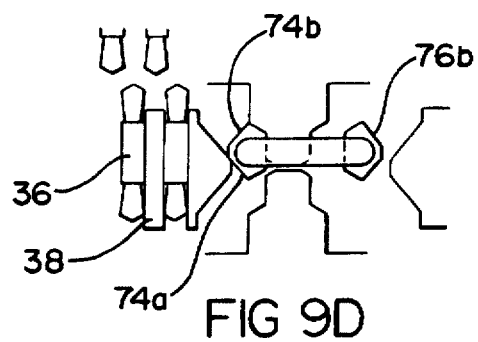

Function of both self-energizing/blocker assemblies is described relative to FIGS. 9A–9H. The description assumes an asynchronous condition exists between shaft 12 and gear 16 in a direction that engages the surfaces illustrated. Asynchronous conditions in the other direction or for gear 14 produce surface engagements that should be obvious from the following description. FIG. 9A illustrates a "neutral position" of all synchronizer components. However, at the start of a shift extensions 44c,46c may be circumferentially positioned any place between ends 74,76. Initial rightward axial movement of shift sleeve 34 by the operator shift force $F_o$ is transmitted by pre-energizer rollers 62 to baulkring 42 via tab abutment surfaces 66a to effect initial frictional engagement of movable cone surface 50 with gear cone surface 26. The initial engagement force of the cone surface is, of course, a function of the force of spring 58 and the angles of the walls of detent grooves 36d. FIG. 9B illustrates initial movement of rigid members 72 from the neutral position in response to axial movement of shift sleeve 34 toward jaw teeth 30 affixed to gear 16. The components in FIG. 9B may be considered to be in a "pre-pre-energized position" wherein the pre-energizer assemblies have not moved baulkring 42 enough to engage cone clutch friction surfaces 26,50. The components in FIG. 9C are in a "pre-energized position" wherein the friction surfaces are engaged enough to start transmitting torque and start to rotate baulkring 42 relative to the hub and shift sleeve enough to engage blocker surfaces 74e,46a but not enough to move rigid member 72 from its circumferential mid position in shift sleeve slot 34a. See FIG. 6. In the "blocking/self-energizing position" of FIG. 9D, the torque has rotated baulkring 42 and rigid members 72 enough to also engage self-energizing surfaces 70b,74a. Hence, in FIG. 9D surfaces 74e,74a are trapped between baulkring blocker surfaces 46a and hub self energizing ramp surfaces 70b. When these surfaces are so trapped and ignoring the effect of the self-energizing ramp surfaces, full operator shift force ($F_o$) applied to rigid member 72 from shift sleeve 34 is transmitted across blocker surfaces 74e,46c, thereby engaging friction surfaces 26,50 with force $F_o$ for producing a synchronizing torque $T_o$. If self-energizing ramp surfaces 70b, 74a were normal to the plane of rotation of hub 32, no self-energizing forces would be produced-and only torque $T_o$ would be reacted to shaft 12. Also, since blocker surfaces 74e,46a are oblique to the plane of rotation, they in addition to preventing asynchronous engagement of jaw teeth 36a,30 and transmitting the shift force $F_o$ to friction surfaces 26,50, also produce a counter torque or unblocking torque counter to the synchronizing torque but of lesser magnitude during asynchronous conditions. As substantial synchronism is reached, the synchronizing torque drops below the unblocking torque, whereby the blocker teeth move out of engagement to allow continued axial movement of the shift sleeve and engagement of movable jaw teeth 36c with gear jaw teeth 30.

Still ignoring the effects of the self-energizing ramps, cone clutch torque provided by the force $F_o$ is expressed by the following equation:

$$T_o = F_o R_c \mu_c / \sin\alpha$$

where:
 $R_c$=the mean radius of the cone friction surface,
 $\mu_c$=the coefficient of friction of the cone friction surface, and
 $\alpha$=the angle of the cone friction surfaces.

Looking now at the affects of the self-energizing ramp surfaces, the synchronizing torque $T_o$ due to the operator applied axial shift force $F_o$ is, of course, reacted across the ramp surfaces, which surfaces produce an axial force component or axial additive force $F_a$ acting in the same direction as operator shift force $F_o$ and also transmitted across the blocker surfaces, thereby further increasing the engaging force of the friction surfaces to provide an additive synchronizing torque which adds to the torque $T_o$. FIG. 10 graphically illustrates the sum of the axial forces $F_o$ plus $F_a$ engaging the clutch friction surfaces and the sum of the synchronizing torques $T_o$ plus $T_a$ produced by the clutch friction surfaces. For a given operator shift force $F_o$ and an operator synchronizing torque $T_o$, the magnitude of the axial additive force is preferably a function of the angle of the engaged self-energizing ramp surfaces. This angle is preferably great enough to produce an additive force $F_a$ of magnitude sufficient to increase synchronizing torque and decrease synchronizing time in response to a given moderate shift effort by the operator. However, this angle is also preferably low enough to produce a controlled axial additive force $F_a$, i.e., the force $F_a$ should increase or decrease in response to the force $F_o$ increasing or decreasing. If the ramp angle is too great, the ramps are self-locking rather than self-energizing; hence, once initial engagement of the cone clutch is effected, the force $F_a$ will rapidly and uncontrollably increase independent of the force $F_o$, thereby driving the cone clutch toward lockup. Self-locking rather than self-energizing decreases shift quality or shift feel, may over stress synchronizer components, may cause over heating and rapid wear of the cone clutch surfaces, and may even override operator movement of the shift lever.

If no additive axial force is preferred for an up or downshift of a gear, the ramp surfaces for the up or downshift may be made parallel to the splines. For example, if ramp surface 70b,74a are made parallel to splines 38, no additive force $F_a$ is provided (for a shift in that direction).

The main variables for calculating self-energizing ramp angles θ and for providing additive axial forces $F_a$, which increase or decrease in proportion to operator forces $F_o$, are cone clutch angle α, cone clutch coefficient of friction $\mu_c$, mean radii ratio $R_c$ of the cone clutch and $R_r$ of the self-energizing ramps, ramp coefficient of friction $\mu_r$, and angle of the self-energizing ramps. Further details for calculating and controlling self-energizing or boost forces may be obtained by reference to U.S. Pat. No. 5,092,439 which is incorporated herein by reference.

Figure 9E:
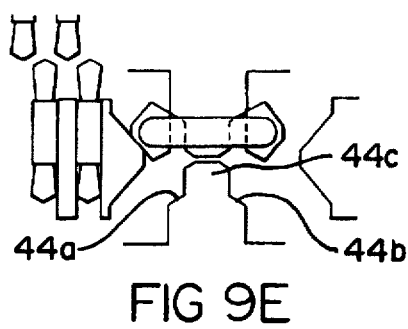
Figure 9F:
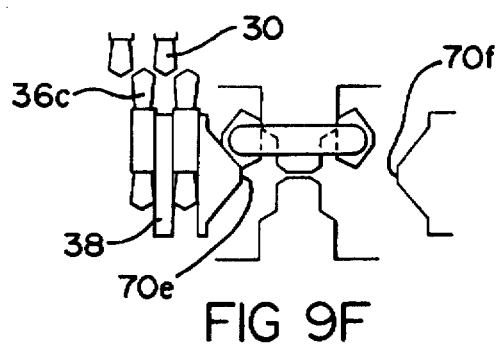
Figure 9G:
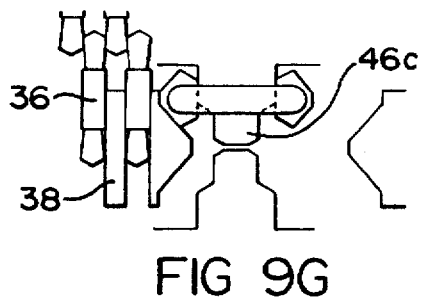
Figure 9H:
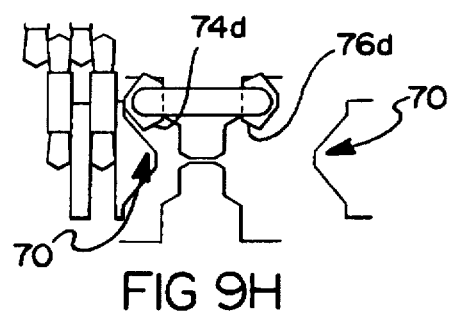

FIG. 9E illustrates a "boosted/unblocked position" which occurs immediately after unblocking torque has separated the blocking surfaces. Self-energizing which occurs in this position may be due to inertia of baulkring 42 and/or while there is less than complete disengagement of the cone clutch. This self-energizing phenomenon continues during the "boosted into gear position" of FIG. 9F and provides an axial assist force acting on shift sleeve 34 in the direction of shift force $F_o$. The assist force helps to restart axial engaging movement of jaw teeth 36c toward engagement with jaw teeth 30 as unblocking occurs and helps move the jaw teeth into engagement when the V-shaped ends of teeth 36a and 30 engage. The assist force lessens what is known as shift notchiness by decreasing the need for the operator to move the shift lever with extra effort to finish a shift as unblocking occurs, i.e., the assist force facilitates smooth and relatively effortless completion of shifts. FIG. 9G illustrates an "end of boost position" and FIG. 9H illustrates a full "engaged position" of jaw teeth 36c,30. Extensions 44c,46c are axially long enough to remain trapped between rigid member ends 74, 76 when the synchronizer components are in the neutral position of FIG. 9A and while the blocker surfaces of blocker teeth 44,46 are engaged with the blocker surfaces of rigid member ends 74, 76, as illustrated in FIGS. 9B–9E. However, as maybe seen by reference to FIGS. 9F–9H, when unblocking occurs for the illustrated shift, extension 46c becomes untrapped or not physically maintained in alignment with the circumferential space between the ends of each rigid member, thereby allowing or not preventing random movement of extension 46c to a position between end 76 and self-energizing means 70. When this occurs the synchronizer components can not be returned to neutral and a shift into gear 14 can not be made. This condition can be remedied by increasing the lengths of extensions 44c, 46c as shown in copending application Ser. No. 08/293,761, filed Aug. 15, 1994.

Two embodiments of a synchronizer mechanism with self-energizing has been disclosed. Many variations and modifications of the embodiments are believed to be within the spirit of the invention. The following claims are intended to cover the inventive portions of disclosed mechanism and variations and modifications believed to be within the spirit of the invention.

What is claimed is:

1. A clutch for frictionally synchronizing and positive connecting first and second drives disposed for relative rotation about a common axis; the clutch comprising:

first jaw means axially movable from a neutral position to an engaged position with second jaw means for positive connecting the drives in response to engaging movement of the first jaw means by an axially directed shift force ($F_o$), the first jaw means including a central opening having internal splines with axially extending flank surfaces slidably mating continuously with axially extending flank surfaces of external splines for preventing relative rotation between the internal and external splines, and the external splines affixed against rotation and axial movement relative to the first drive;

a first friction surface axially movable into engagement with a second friction surface in response to the engaging movement of the first jaw means for producing a synchronizing torque ($T_o$);

first and second angled blocker surfaces movable into engagement in response to the engaging movement of the first jaw means for preventing asynchronous engagement of the jaw means, for transmitting the shift force ($F_o$) to the first friction surface to effect an engagement force of the friction surfaces, and for producing a torque counter to the synchronizing torque for moving the first and second blocker surfaces out of engagement as synchronization is reached;

first and second self-energizing means operative when engaged to react the synchronizing torque for producing an additive axial force ($F_a$) in the direction of the shift force ($F_o$) for increasing the engagement force of the friction surfaces, the first and second self-energizing means including means for directing the additive axial force ($F_a$) to the first friction surface via the blocker surfaces; characterized by:

a first element defining a hub including an outer circumference defining the external splines;

a first baulkring including the first friction surface and a plurality of the second blocker surfaces, the baulkring being axially movable away from the hub toward the second friction surface;

the first jaw means central opening and internal splines affixed to a second element defined by a shift sleeve;

the first self-energizing means including a plurality of first self-energizing ramp surfaces affixed to a one of the elements;

a plurality of members mounted about a one of the elements for limited rotation relative to each of the elements and secured against radial movement relative to each of the elements, each member including a second angled self-energizing ramp surface operative in response to the synchronizing torque to engage a one of the first self-energizing ramp surfaces, whereby the additive axial force ($F_a$) is produced and directed to the first friction surface via the blocker surfaces.

2. The clutch of claim 1, wherein at least one of the first and second self-energizing means includes a non-boost surface extending perpendicular to a rotational plane of the hub and engagable when the shift sleeve is in a neutral position.

3. The clutch of claim 1, wherein the self-energizing ramp surfaces remain engaged after the first and second blocker surfaces move out of engagement for providing an assist force for moving the first jaw means into engagement with the second jaw means.

4. The clutch of claim 1, further including a third drive disposed for rotation about the common axis relative to the first and second drives and axially spaced from the second drive;

the shift sleeve internal splines defining a third jaw means axially movable from a neutral position into an engaged position with a fourth jaw means for positive connecting the first and third drives in response to engaging movement of the shift sleeve by a second shift force ($F_o$) directed axially opposite the first shift force ($F_o$);

a second baulkring including a third friction surface and a plurality of fourth blocker surfaces, the baulkring being axially movable away from the hub toward a fourth friction surface;

third and fourth angled blocker surfaces movable into engagement in response to the engaging movement of the third jaw means for preventing asynchronous engagement of the third and fourth jaw means, for transmitting the shift force ($F_o$) to the third friction surface to effect an engagement force of the third and fourth friction surfaces, and for producing a torque counter to the synchronizing torque for moving the third and fourth blocker surfaces out of engagement as synchronization is reached;

the first self-energizing means including a plurality of third self-energizing ramp surfaces defined in the hub outer circumference;

the plurality of members each including a fourth angled self-energizing ramp surface of the second self-energizing means, the third and fourth blocker surfaces operative to engage in response to synchronizing torque from the third and fourth friction surfaces such that both the axially directed shift force ($F_o$) and the additive axial force ($F_a$) are transferred across the plurality of members to the second baulkring.

5. The clutch of claim 4, wherein each member of the plurality of members includes a first end defining the second and fourth self-energizing ramp surfaces and defining the first and third blocker surfaces, the surfaces of the member first end for reacting with the first and third self-energizing ramp surfaces and second and fourth blocker surfaces to effect synchronizing of the second and third drives with the first drive when the first drive is initially rotating faster than the second and third drives.

6. The clutch of claim 5, wherein each member includes a second end circumferentially spaced from the first end and rigidly secured together by a circumferentially extending portion slidably received in a slot in the shift sleeve for allowing the limited relative rotation and the non-axial movement relative to the shift sleeve, the second end including self-energizing ramp surfaces and blocker surfaces respectively for reacting against additional self-energizing ramp surfaces defined by the hub and blocker surfaces defined by the first and second, baulkrings, the surfaces defined by the second end and the additional surfaces to effect synchronizing of the second and third drives with the first drive when the first drive is initially rotating slower than the second and third drives.

7. A clutch for frictionally synchronizing and positive connecting first and second drives disposed for relative rotation about a common axis; the clutch comprising:

first jaw means axially movable from a neutral position to an engaged position with second jaw means for positive connecting the drives in response to engaging movement of the first jaw means by an axially directed shift force ($F_o$), the first jaw means including a central opening having internal splines with axially extending flank surfaces slidably mating continuously with axially extending flank surfaces of external splines for preventing relative rotation between the internal and external splines, and the external splines affixed against rotation and axial movement relative to the first drive;

a first friction surface axially movable into engagement with a second friction surface in response to the engaging movement of the first jaw means for producing a synchronizing torque ($T_o$);

first and second angle blocker surfaces movable into engagement in response to the engaging movement of the first jaw means for preventing asynchronous engagement of the jaw means, for transmitting the shift force ($F_o$) to the first friction surface to effect an engagement force of the friction surfaces, and for producing a torque counter to the synchronizing torque for moving the first and second blocker surfaces out of engagement as synchronization is reached;

first and second self-energizing means operative when engaged to react the synchronizing torque for producing an additive axial force ($F_a$) in the direction of the shift force ($F_o$) for increasing the engagement force of the friction surfaces, the first and second self-energizing means including means for directing the additive axial force ($F_a$) to the first friction surface via the blocker surfaces; characterized by:

the first self-energizing means including a plurality of first self-energizing ramp surfaces affixed against movement relative to the first drive;

the first jaw means including a plurality of circumferentially spaced apart openings extending radially therethrough;

a rigid member mounted in each spaced apart opening for limited rotation relative thereto and for non-axial movement relative thereto, each rigid member including a second angled self-energizing ramp surface of the second self-energizing means.

8. The clutch of claim 7, further including a third drive disposed for rotation about the common axis relative to the first and second drives and axially spaced from the second drive;

the shift sleeve internal splines defining a third jaw means axially movable from a neutral position into an engaged position with a fourth jaw means for positive connecting the first and third drives in response to engaging movement of the shift sleeve by a second shift force ($F_o$) directed axially opposite the first shift force ($F_o$);

a third friction surface axially movable into engagement with a fourth friction surface in response to engaging movement of the third jaw means for producing a synchronizing torque ($T_o$) for the first and third drives;

third and fourth angled blocker surfaces movable into engagement in response to the engaging movement of the third jaw means for preventing asynchronous engagement of the third and fourth jaw means, for transmitting the shift force ($F_o$) to the third friction surface to effect an engagement force of the third and fourth friction surfaces, and for producing a torque counter to the synchronizing torque for moving the third and fourth blocker surfaces out of engagement as synchronization is reached;

the first self-energizing means including a plurality of third self-energizing ramp surfaces affixed against movement relative to the first drive;

the third jaw means including a plurality of circumferentially spaced apart openings extending radially therethrough;

a rigid member mounted in each spaced apart opening of the third jaw means for limited rotation relative thereto and for non-axial movement relative thereto, each rigid member including a fourth angled self-energizing ramp surface of the second self-energizing means.

9. The clutch of claim 8, wherein the openings in the first and third jaw means are the same openings and the rigid members including the second and fourth self-energizing surfaces are rigid integral members.

10. The clutch of claim 9, wherein each rigid integral member includes a first end defining the second and fourth self-energizing ramp surfaces and defining the first and third blocker surfaces, the surfaces of the rigid integral member first end for reacting with the first and third self-energizing ramp surfaces and second and fourth blocker surfaces to effect synchronizing of the second and third drives with the first drive when the first drive is initially rotating faster than the second and third drives.

11. The clutch of claim 10, wherein each rigid integral member includes a second end circumferentially spaced from the first end and rigidly secured together by a circumferentially extending portion slidably received in a slot in the shift sleeve for allowing the limited relative rotation and the non-axial movement relative to the shift sleeve, the second end including self-energizing ramp surfaces and blocker surfaces respectively for reacting against additional self-energizing ramp surfaces defined by the hub and blocker surfaces defined by the first and second baulkrings the surfaces defined by the second end and the additional surfaces to effect synchronizing of the second and third drives with the first drive when the first drive is initially rotating slower than the second and third drives.

* * * * *